B. A. KNOWLES.
TEAT CUP FOR MILKING MACHINES.
APPLICATION FILED NOV. 16, 1916.

1,333,261. Patented Mar. 9, 1920.

Inventor
Bernard A. Knowles

By Whittemore Hulbert & Whittemore
Attorneys

UNITED STATES PATENT OFFICE.

BERNARD A. KNOWLES, OF AZALIA, MICHIGAN.

TEAT-CUP FOR MILKING-MACHINES.

1,333,261.

Specification of Letters Patent.

Patented Mar. 9, 1920.

Application filed November 16, 1916. Serial No. 131,666.

*To all whom it may concern:*

Be it known that I, BERNARD A. KNOWLES, a citizen of the United States of America, residing at Azalia, in the county of Monroe and State of Michigan, have invented certain new and useful Improvements in Teat-Cups for Milking-Machines, of which the following is a specification, reference being had therein to the accompanying drawings.

This invention relates to teat cups for milking machines, and refers more particularly to a new and improved construction adapted for use in milking machines of the intermittent or pulsating type.

It is one of the objects of the invention to provide a construction of the character above referred to in which the teat cup itself has a longitudinally reciprocating movement; to so construct and arrange the parts that upon the suction or vacuum stroke the outside air pressure will cause a collapsing of a portion of the cup, thus drawing the lower end of the teat cup upward; to provide resilient means for returning the teat cup to its original or expanded position upon release of the vacuum pull; to provide means for permitting the ingress of air from the lower portion of the cup to the inside of the collapsible portion, upon release of the vacuum pull; and in general to provide a new and improved construction of the character above referred to.

The invention further resides in such features of construction as will more fully hereinafter appear.

Heretofore in milking machines of the intermittent or pulsating type, various constructions of teat cups have been used, such as those which are laterally collapsible and those in which a flow of air between the cup and the teat has been used for imparting the alternate suction and releasing movement. The present invention contemplates a materially different construction in which the cup is so constructed and arranged that the main portion of the teat cup has a longitudinal reciprocating movement.

Figure 1:
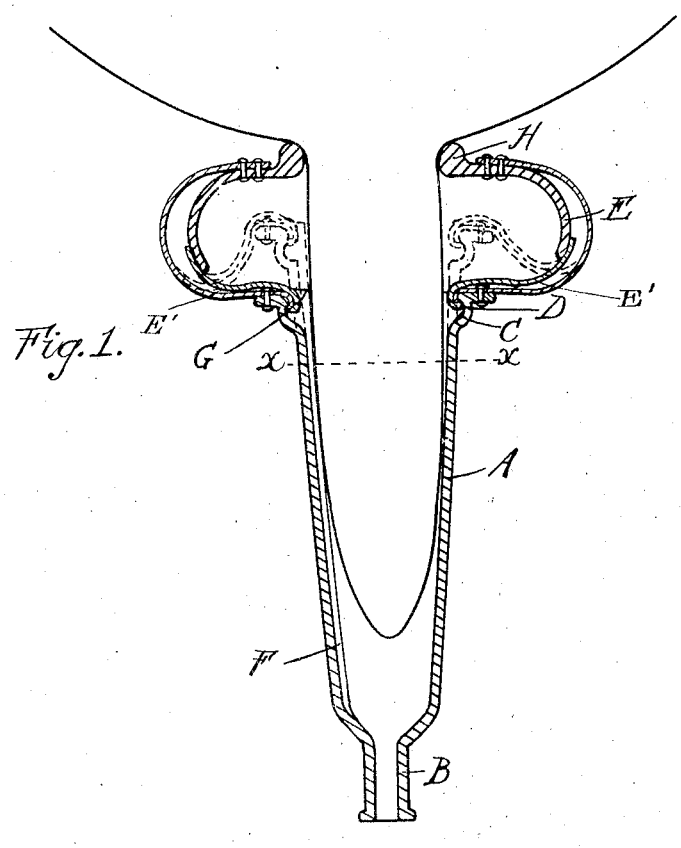
Figure 1 is a side elevation partly in section showing the teat cup embodying my invention.
Figure 2:
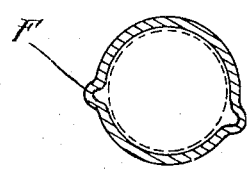
Fig. 2 is a cross section on the line *x—x* of Fig. 1.

Referring first in detail to the construction, A designates a teat cup which at its lower end is provided with a nipple B for receiving the conduit that leads to the suction apparatus. This main body portion A is preferably formed of celluloid or other transparent material, although the invention in its broader aspects is not limited to the use of a transparent cup. At its upper end the main body portion A is provided with a flange C to which is secured a flange D formed on the lower end of a collapsible air chamber, comprising the relatively thick walled upper portion E formed preferably of stiff rubber and the lower portion E' formed of flexible material which lower flexible portion, when the pressure within the chamber E is reduced to less than atmospheric, will collapse, thus causing the main body portion A to move upward. When, however, the suction is released and the chamber E E' allowed to fill with air the resiliency of said walls will force the chamber back to its normal position, as shown in full lines in Fig. 1, thus a reciprocating longitudinal movement of the cup will be produced.

For allowing the ingress or egress of air from the chamber E E' the main body section A is preferably provided with one or more air channels F which at their upper ends open into said chamber through an aperture G. The suction apparatus in milking machines of this type is arranged to alternately exert a vacuum pull of a predetermined amount and then to release this pull and permit the return to atmospheric pressure or nearly atmospheric pressure. When the vacuum pull is produced upon the lower end of the cup A it will also, through the channel F, draw out air from the chamber E E' reducing the pressure in the latter to less than atmospheric. The pressure of the outside air will then force the walls of the chamber E E' to collapse to the position shown in dotted lines in Fig. 1 and move the main body section A toward the upper edge H of said chamber. However, as soon as the suction is released on the lower end of the cup, air will flow back into said chamber and the wall E' of the latter will spring to its original position.

While I have shown and described the conduit F as a grooved portion in the wall of the main body section A, any suitable conduit or connection might be employed and various other changes in the details of construction can be made within the scope of my invention.

What I claim as my invention is:

1. In a milking machine, a teat cup comprising a main body portion, a collapsible air chamber adapted on the suction stroke to cause the main body portion to move longitudinally in one direction, and resilient means tending to return the collapsible portion to move the main body portion in the opposite direction.

2. In a milking machine, a teat cup comprising a main body portion having a suction nipple at the lower end, and a collapsible air chamber at its upper end, the inner face of the main body portion being provided with a channel forming an air passage from the suction nipple to the air chamber.

3. In a milking machine, a teat cup comprising a main body portion having a suction nipple at the lower end, and a collapsible air chamber at its upper end, said body portion being formed with an air passage from the suction nipple to the air chamber.

4. In a milking machine, a teat cup comprising a main body portion, and a collapsible air chamber, said body portion being upwardly actuable through collapse of said air chamber and being downwardly actuable upon expansion thereof.

In testimony whereof I affix my signature.

BERNARD A. KNOWLES.

Witnesses:
BYRON J. CORBIN,
MARY CLARK.